(12) United States Patent
Carlander (10) Patent No.: US 8,769,044 B2
(45) Date of Patent: Jul. 1, 2014

(54) CONTROLLING, FILTERING, AND MONITORING OF MOBILE DEVICE ACCESS TO THE INTERNET, DATA, VOICE, AND APPLICATIONS

(76) Inventor: Carrie Carlander, Pollar, CA (US)

( * ) Notice: Subject to any disclaimer, the term of this patent is extended or adjusted under 35 U.S.C. 154(b) by 0 days.

(21) Appl. No.: 13/340,693

(22) Filed: Dec. 30, 2011

(65) Prior Publication Data

US 2012/0102147 A1    Apr. 26, 2012

Related U.S. Application Data (60) Division of application No. 13/215,128, filed on Aug. 22, 2011, now abandoned, which is a continuation of application No. 12/574,638, filed on Oct. 6, 2009, now Pat. No. 8,005,913, which is a continuation of application No. 11/336,297, filed on Jan. 19, 2006, now abandoned.

(60) Provisional application No. 60/646,173, filed on Jan. 20, 2005.

(51) Int. Cl.
*G06F 15/16* (2006.01)

(52) U.S. Cl.
USPC .......................... 709/217; 709/203; 709/227

(58) Field of Classification Search
USPC .......... 709/200–203, 217–227, 228, 229, 230
See application file for complete search history.

(56) References Cited

U.S. PATENT DOCUMENTS

| | | | |
|---|---|---|---|
| 5,983,270 A | 11/1999 | Abraham et al. | |
| 5,999,942 A | 12/1999 | Talati | |
| 6,124,854 A | 9/2000 | Sartain et al. | |
| 6,581,161 B1 | 6/2003 | Byford | |
| 6,606,659 B1 | 8/2003 | Hegli et al. | |
| 6,947,985 B2 | 9/2005 | Hegli et al. | |
| 7,032,237 B2 | 4/2006 | Tsunoda et al. | |
| 7,089,246 B1 * | 8/2006 | O'Laughlen | 726/4 |
| 7,142,848 B2 | 11/2006 | Owen et al. | |
| 7,185,015 B2 | 2/2007 | Kester et al. | |
| 7,194,254 B2 | 3/2007 | Kelkar | |
| 7,194,464 B2 | 3/2007 | Kester et al. | |
| 7,266,089 B2 | 9/2007 | Cook | |
| 7,330,717 B2 * | 2/2008 | Gidron et al. | 455/418 |
| 7,448,067 B2 | 11/2008 | Yadav | |
| 7,532,882 B2 | 5/2009 | Owen et al. | |
| 7,751,809 B2 | 7/2010 | Owen et al. | |
| 7,797,529 B2 | 9/2010 | Jiang et al. | |
| 7,953,871 B2 * | 5/2011 | Kuz et al. | 709/229 |
| 8,005,913 B1 * | 8/2011 | Carlander | 709/207 |
| 8,286,256 B2 | 10/2012 | Siegel et al. | |

(Continued)

OTHER PUBLICATIONS

UKCode of Practice for the Self-Regulation of New Forms of Content on Mobiles, Orange Personal Communication Services Ltd., Virgin Telecoms Ltd. Vodafone Ltd., Hutchinson 3GUK Ltd., Feb. 2004.

(Continued)

*Primary Examiner* — Moustafa M Meky (57) ABSTRACT

Systems and methods for controlling, filtering, and monitoring mobile device access to the internet are disclosed. According to an embodiment a server is responsible for controlling, filtering and monitoring internet activity. For every request, the server interacts with back-end databases that categorize requests, and based on user/carrier/corporate settings, allow or disallow access to particular content.

20 Claims, 6 Drawing Sheets

(56) References Cited

U.S. PATENT DOCUMENTS

| | | | |
|---|---|---|---|
| 2002/0103862 A1* | 8/2002 | Burr | 709/204 |
| 2002/0124190 A1 | 9/2002 | Siegel et al. | |
| 2003/0120499 A1 | 6/2003 | MacLean et al. | |
| 2003/0167250 A1 | 9/2003 | Sash | |
| 2004/0064418 A1* | 4/2004 | Koster et al. | 705/52 |
| 2004/0196821 A1 | 10/2004 | Haddad et al. | |
| 2005/0010952 A1 | 1/2005 | Gleissner et al. | |
| 2005/0015453 A1 | 1/2005 | Chin et al. | |
| 2005/0021428 A1 | 1/2005 | Costello | |
| 2005/0097595 A1* | 5/2005 | Lipsanen et al. | 725/25 |
| 2005/0191991 A1 | 9/2005 | Owen et al. | |
| 2005/0210035 A1 | 9/2005 | Kester et al. | |
| 2005/0282559 A1* | 12/2005 | Erskine et al. | 455/456.4 |
| 2006/0015580 A1 | 1/2006 | Gabriel et al. | |
| 2006/0075015 A1 | 4/2006 | Wu et al. | |
| 2006/0080439 A1* | 4/2006 | Chud et al. | 709/225 |
| 2006/0101487 A1 | 5/2006 | Jarman et al. | |
| 2006/0173793 A1 | 8/2006 | Glass | |
| 2006/0256012 A1 | 11/2006 | Fok et al. | |
| 2007/0150956 A1 | 6/2007 | Sharma et al. | |
| 2007/0207777 A1 | 9/2007 | Owen et al. | |
| 2009/0113529 A1 | 4/2009 | Siegel et al. | |
| 2009/0215539 A1 | 8/2009 | Xidos et al. | |
| 2009/0313479 A1 | 12/2009 | Schroter | |

OTHER PUBLICATIONS

Websense Press Release, Nortel, Websense Join Force on Wireless Security, San Diego, Oct. 25, 2005.

Websense Web Security Suite Quick Start Guide, Published Oct. 17, 2005.

Cellular News, Protecting minors from adult content, posted to website Oct. 22, 2004.

Balint, Kathryn, Websense deal opens the door to cell phones Its filtering technology targets unwanted data, Oct. 26, 2005.

Mobile Adult Content Congress, Responsible Delivery of Adult Content to the Mobile Phone, Program and Speakers webpage, Jan. 24-26, 2006, unknown announcement date.

Carrie Carlander Complaint filed May 10, 2006.

WebSense Answer to Complaint filed Jun. 14, 2006.

* cited by examiner

CONTROLLING, FILTERING, AND MONITORING OF MOBILE DEVICE ACCESS TO THE INTERNET, DATA, VOICE, AND APPLICATIONS

CROSS-REFERENCE TO RELATED APPLICATIONS

This application is a divisional of U.S. patent application Ser. No. 13/215,128 filed Aug. 22, 2011, now abandoned which is a continuation of U.S. patent application Ser. No. 12/574,638, filed Oct. 6, 2009, now issued U.S. Pat. No. 8,005,913, which is a continuation of U.S. patent application Ser. No. 11/336,297, filed Jan. 19, 2006, now abandoned, which claims priority to U.S. Provisional Application No. 60/646,173, filed Jan. 20, 2005, the contents of each hereby incorporated by reference in their entireties.

BACKGROUND

The disclosure pertains to the access of mobile devices to content from the Internet, for example, to control, filter, and monitor activity and applications on the mobile device. A mobile phone or mobile device can now be used to engage in chat room discussions, receive video, receive email, receive picture mail, play or download games, download ring tones, download screen savers, receive daily comics or other types of feeds including RSS feeds, Wireless Application Protocol ("WAP") browser access, phone blogging, and other uses. Before long, mobile phones will demonstrate the ability to interact with vending machines, tollbooths, mobile marketing, and more. In addition to the increased benefits brought on by the advancement in mobile phone technology, greater problems are also on the horizon.

Increased use of mobile phones for Internet activities is of concern in both business and consumer environments. In a business setting, employers may desire to monitor and manage Internet activities on mobile phones of their employees to limit access to Internet sites inappropriate for a workplace, promote productivity, and control costs. Similarly, parents may wish to prevent their children from accessing inappropriate Internet sites and to limit their Internet activities on the mobile phone. Internet activities on personal computers are already being monitored and managed, and the proliferation of the mobile phone use merits a system to control Internet activities on mobile phones.

BRIEF SUMMARY

The methods and systems described here implement techniques for controlling, filtering, and monitoring the access of mobile phones to content from the Internet. In one aspect, internet activity of a mobile phone associated with a user profile is managed. A request for content is received from the mobile phone. The request is processed to determine if the requested content is a valid content accessible by the mobile phone associated with the user profile. The request for content by the mobile phone associated with the user profile is responded to by acting as an intermediary for the content to the mobile phone if access to the content is allowed for the user profile and sending an error message to the mobile phone if access to the content is not allowed for the user profile.

Implementations can include one or more of the following features: For example, the request for content can be received from a mobile browser executing on the mobile phone. The request for content is formatted using a communication protocol comprising a hypertext transfer protocol (HTTP), a secure hypertext transfer protocol (HTTPS), a user datagram protocol, and a file transfer protocol (FTP). The request for content can also be received as a uniform resource locator (URL) using HTTP. Only valid protocol exchanges originating from the mobile phone are authorized. A limit on a total number of downloads allowed over a period of time for the mobile phone associated with the user profile may be set or turned off. The downloads allowed can include text, pictures, games, news feeds, and ring tones. A monetary download limit based on usage or accumulation can also be set. A limit on a total number of non-verbal communication instances authorized over a period of time for the mobile phone associated with the user profile can also be set or turned off. The non-verbal communication can include short message service (SMS) and instant messaging (IM).

Implementations can also include one or more of the following additional features: For example, Content filtering can be implemented to identify and block access to internet sites deemed not authorized for the mobile phone associated with the user profile. The internet sites deemed not authorized can include internet sites containing sexually explicit content, adult content, content inappropriate for the workplace. Content filtering can be implemented to compare a request to access an internet site against data in a master database. The master database can include a list of frequently accessed sites, protocols, and computer applications. Wireless application protocol sites and other downloadable internet sites can be added to the master database. Presence of viruses can be detected to prevent infection of the mobile phone.

Furthermore, implementations can also include one or more of the following additional features: For example, the internet activity of the mobile phone associated with the user profile can be monitored to create a report including a list of wireless application protocol sites accessed, downloads obtained, and time spent interacting with online activities is generated. Policies for managing internet activity on the mobile phone can be set. Setting the policies can include designating internet websites and contents as either authorized or unauthorized for mobile phone associated with the user profile. Communication between the mobile phone and a carrier server can be mediated to enforce access control and security. Also, internet activity for the mobile phone associated with the user profile can be customized. Customizing the internet activity includes selecting authorized internet sites; setting download limits; and setting time limits of the internet activity.

Aspects of these systems and methods are embodied in computer hardware and software. These and other features of these systems and methods are described below in the claims.

DETAILED DESCRIPTION OF THE EMBODIMENTS

Techniques for controlling and monitoring WAP applications are described herein. Particularly, systems and methods for controlling, filtering, and monitoring mobile phone access to the Internet are disclosed. In the following description, for the purpose of explanation, numerous specific details are set forth in order to provide a thorough understanding of the present disclosure. It will be apparent, however, to one of ordinary skill in the art that the present disclosure may be practiced without these specific details. In other instances, well-known structures are shown in block diagram form to avoid unnecessarily obscuring the present disclosure.

Figure 1:
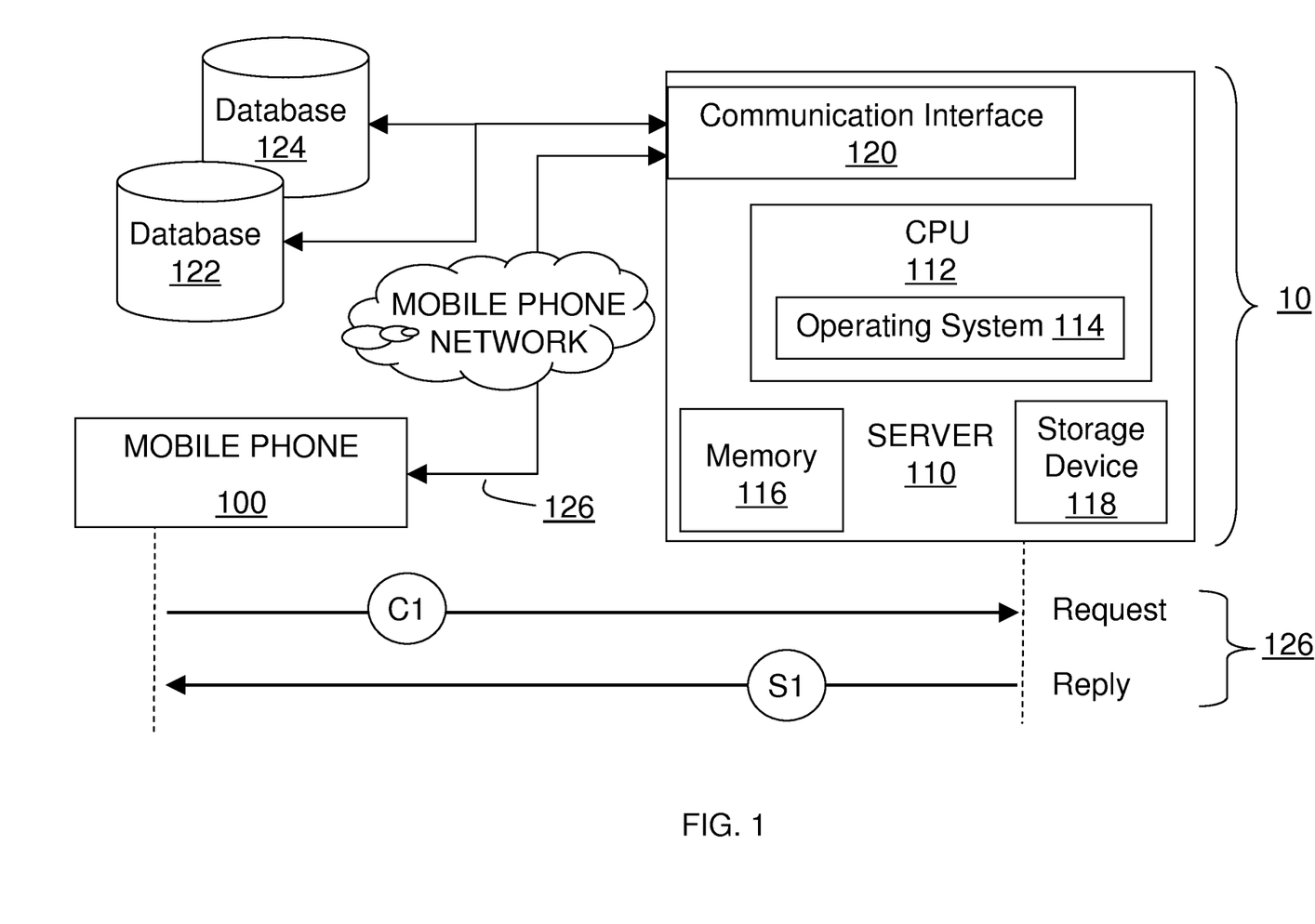
FIG. 1 is a system drawing and a protocol according to an embodiment.

According to one aspect of the techniques, a system 10 is implemented to regulate communication 126 between a server 110 and a mobile phone 100 as shown in FIG. 1A. Particularly, the server 110 is responsible for controlling, filtering, and monitoring Internet activity on the mobile phone. For example, a user may send requests to the server 110 from the mobile phone 100 for documents and other files accessible from the Internet. The server 110 can be a web server and includes at least a central processing unit ("CPU") 112, a memory unit 116, a storage device 118, and a communication interface 120. Server 110 can also be implemented as a proxy server, or intermediary between another server.

The server 110 may be compatible with various platforms including Microsoft Windows™, Sun Microsystem Sun™, open source Linux, and other suitable platforms. Depending on the platform, an appropriate operating system 114 is executed by the CPU 112. The memory unit 116 may be a volatile memory including various types of random access memory ("RAM") such as dynamic RAM ("DRAM"), synchronous DRAM ("SDRAM"), double data rate SDRAM ("DDR"), synchronous graphics RAM ("SDRAM"), and video RAM ("VRAM"). The memory unit 116 may also be a non-volatile memory including read only memory ("ROM"), flash memory, and programmable memory such as erasable programmable ROM ("EPROM") and electrically erasable programmable ROM ("EEPROM"). The storage device 118 may be a portable or removable memory including a compact disk ROM ("CDROM"), a tape, and a hard drive. The memory unit 116 and/or the storage device 118 may be implemented to store the requests received from the mobile phone 100.

The communication interface 120 may be configured to receive requests as data packets from the mobile phone 100 and to forward the requests to the CPU 112 for processing. The requests C1 may be formatted in a compatible mobile device that can include communication protocols such as Hypertext Transfer Protocol ("HTTP"), Secure Hypertext Transfer Protocol ("HTTPS"), File Transfer Protocol ("FTP"), Simple Mail Transfer Protocol ("SMTP"), Post Office Protocol ("POP"), or other suitable communication protocols.

In some implementations, the requests may be in the form of a Universal Resource Locator ("URL") using HTTP. Processing the requests C1 can include a log-on validation intrinsic to the mobile device, associated enterprise or user to ensure that the mobile phone 100 associated with a user profile is authorized to access the server.

If authorized, the requests C1 are further processed by the CPU 112 to determine if the content specified by the requests C1 is accessible by the mobile phone 100 associated with the user profile. If the requests C1 are for authorized content, the content is either retrieved and forwarded to the mobile phone 100 in a reply signal S1, or an authorization is made to the mobile device (e.g., a key) so that the content can be requested directly. If the requested content is unauthorized, an error message is forwarded in the reply signal S1. The server 110 may also be communicatively linked to multiple databases 122, 124 used in validating the requests C1.

Figure 2A:
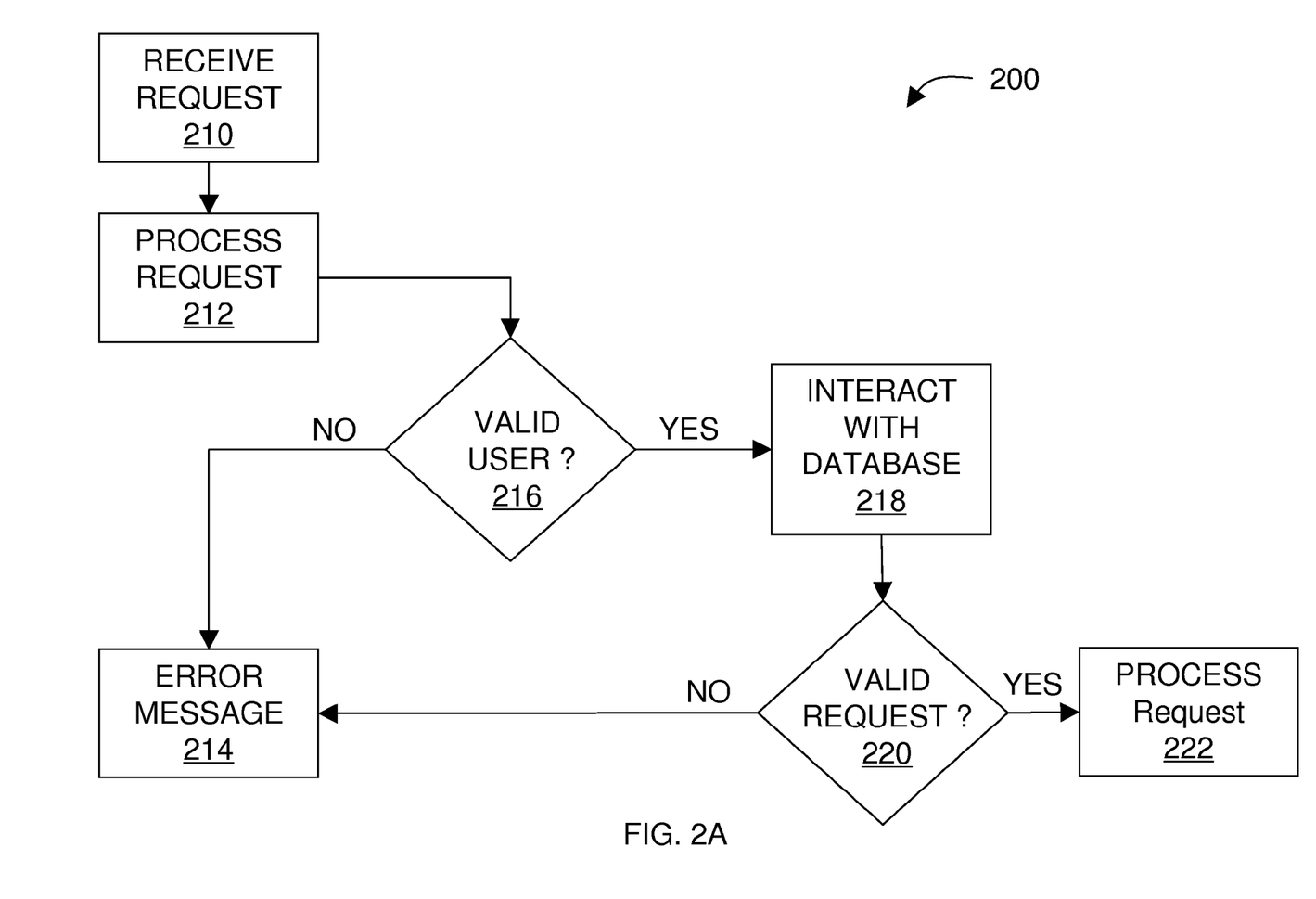
FIG. 2A is a flow chart describing a process of controlling, monitoring, and filtering internet activity according to an embodiment.

FIG. 2 is a flow chart describing a process 200 of controlling, monitoring, and filtering Internet access on the mobile phone 100. At 210, the server 110 receives the request C1 for content from the mobile phone 100. The request C1 is forwarded to the CPU 112 for processing at 212.

The user profile associated with the mobile phone 100 is validated to determine if the mobile phone represents an authorized user at 216. If the user is not authorized, an error message is returned to the mobile phone 100 at 214. If the mobile phone represents a valid user, the request C1 is further processed at 218.

For each request, the server 110 can interact with a back-end database 122 for file system that contains a categorized listing of domain names, sub-domain names, websites, keywords, and/or individual files. The server 110 will also interact with a back-end database 124 that contains a categorized listing of user, carrier, or enterprise settings that allow or disallow access by the particular mobile phone 100 communicating with the server 110 to a particular domain name, sub-domain name, website, keyword, and/or individual file. If the request C1 is determined to be valid, the content requested can be retrieved with the server acting as a proxy, and transmitted to the mobile phone 100 at 222. However, if the requested content is not accessible for the mobile phone 100, an error message is transmitted to the mobile phone 100 at 214.

Figure 2B:
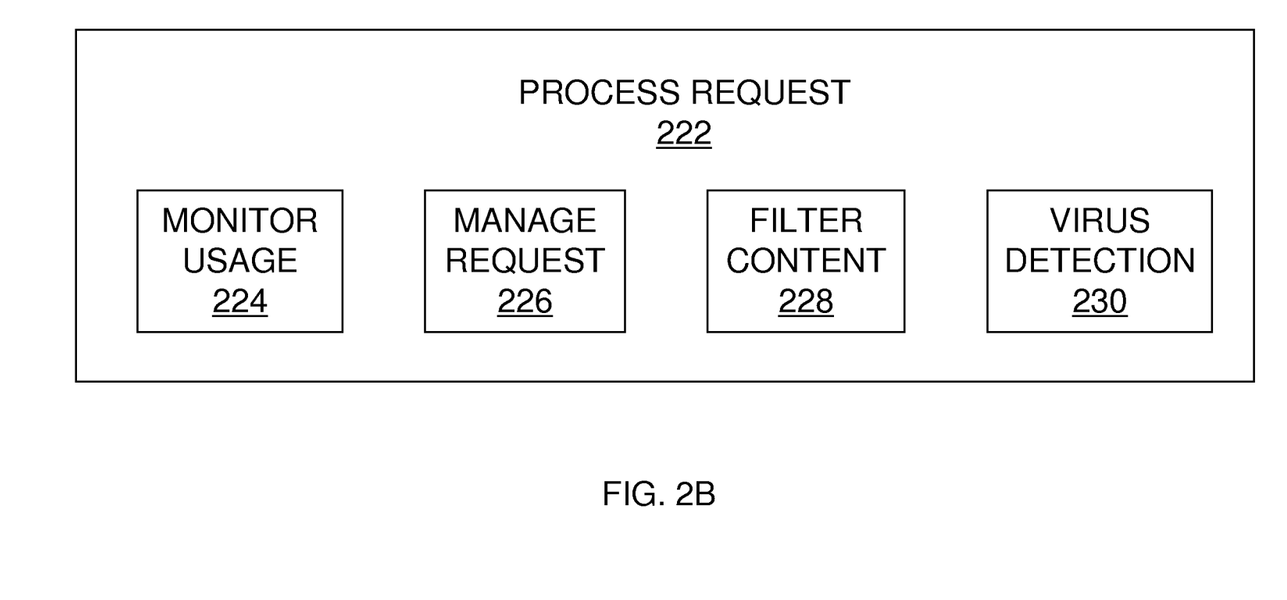
FIG. 2B is a block diagram describing a list of possible functions available in the process of controlling, monitoring, and filtering internet activity.

Processing the request at 222 can further include additional functions to control and manage the Internet activity on the mobile phone 100. FIG. 2B describes possible functions executed at 222.

The system 10 can be implemented to manage and limit the server 110 from responding to the requests C1 from the mobile phone 100 at 226. The system 10 can allow users to place limits on the number of downloads over a specific period of time. The downloads can include text, pictures, games, news feeds, ring tones, applications, and other content available from the Internet.

In some implementations, the system 10 can allow an administrator to place limits on the number of non-verbal communications over a specific period of time. Non-verbal communications may include Short Message Service ("SMS") text messaging and Instant Messaging ("IM"). Users can also choose to turn off downloads and SMS/IM messaging. Each of the functions in process request 222 (monitor usage 224, manage request 226, filter content 228, and virus detection 230) references another data source such as user/policy lists, virus lists, spammer or white/black lists, web site lists, and other suitable data sources for completing the functions.

In controlling and limiting Internet activity on the mobile phone 100 for the users at 226, monetary download limits can be implemented to facilitate simplification of user account management. The system 10 can be implemented to control the incremental expenditures associated with a subscriber's mobile phone 100 on a usage or accumulation basis. This can help minimize frivolous personal use of the mobile phone 100 and simplify management of monthly expenses. An administrator may be allowed to place limits on non-verbal use of the mobile phone 100 to restrict undesirable or excess WAP resources.

In addition to limiting the internet activity, the system 10 can be implemented to perform content filtering at 228. The system 10 can also be implemented to identify and block access to Internet sites containing content that may be offensive or otherwise not allowed or desired at home or at the workplace. For example, the system 10 can block access to Internet sites containing sexually explicit or other material deemed inappropriate at the workplace. In some implementations, the system 10 may identify and block access to Internet sites containing content other than adult content that may be offensive or not allowed for certain users.

According to another aspect of the techniques, the system 10 may take advantage of a master database (not shown) for filtering content and managing Internet use. The database can include a list of the frequently accessed Internet sites, communication protocols, and computer applications on the Web. Furthermore, it can include multiple lists, one each for web sites, spammers, viruses, and other suitable data used for filtering content and managing Internet use.

In one implementation, a single master database can be used to store and manage all information related to the multiple lists described above. In other implementations, the master database can include multiple databases, with each database used to store and manage different types of information, including additional security provisioning. For example, a first database can be used to store and manage the list of frequently accessed Internet sites; a second database can be used to store and manage communication protocols; and a third database can be used to store and manage computer applications on the Web. In still other implementations, WAP sites and other downloadable locations can be added to the database.

The system 10 can also be implemented to include virus detection at 230. Downloading content from Internet sites may leave the mobile phone 100 susceptible to infections from viruses. The danger from viral infection is greater when downloading from Internet sites outside the approved locations. The system 10 can include virus detection capabilities to help prevent infection of the user's mobile phone 100.

The system 10 can also be implemented to monitor Internet activity on the mobile phone 100 at 224. The system 10 can provide a report including information about the use of the mobile phone 100 in connection with the requests made to the server 110. This report can include WAP sites visited, downloads obtained, and time spent interacting with online activities such as games.

Controlling, filtering, and monitoring Internet activity in an enterprise environment may be necessary to control expenditures and increase productivity. The system 10 can be implemented to allow a company to regulate unproductive and undesired mobile phone usage by its employees by limiting or denying inappropriate downloads. The system 10 can also be implemented to allow an enterprise to control which WAP web sites can be accessed by its employees and to limit the time that employees can surf or access these sites. Currently, many companies provide their employees with mobile phones and control the contract with the carrier, but the companies do nothing to differentiate between professional and personal mobile phone use.

In some implementations, the system 10 can be implemented in a consumer environment to provide parents the ability to control, filter, and monitor internet activity on their children's mobile phones 100. With ring tones and other downloadable applications (screen savers, pictures, games, etc.) on the rise, many of the downloads costing several dollars per download, the system 10 may be implemented to allow parents to control costs as well as the types of content accessed by their children.

Example of System Operation

In operation, the techniques can be implemented to design a system to focus on scanning Internet traffic and requests for content, determining the type of request being made, and then using information corresponding to the determined request type to decide which one of multiple adaptors to send the request. Each adaptor can be designed to process specific types of request for content. The adaptor can then interface with off-the-shelf databases or lists of: categorized websites; viruses; SPAM white/black lists; categorized list of carrier-hosted applications; and a carrier's user database for profiles and options.

Similarly, off-the-shelf virus lists, website lists, other suitable information lists for filtering, controlling, and monitoring Internet activity can be used. This design flexibility allows a carrier or an enterprise to decide who can make the best-of-breed lists for each category, and allows for easy removal or replacement of the lists.

For example, in some implementations, the carrier's customer profile can specify content restriction policy such as no pornography and no hacking. When a URL request is received, the request is sent to the appropriate adaptor, with the information that no pornography is allowed and no hacking is allowed. Then the URL request is referenced against a database (which can be an off-the-shelf database rented or licensed from a vendor) to determine if the request is in the pornography category. The result of the determination is used to decide whether the request should be served or refused. Alternatively, logical filters can be implemented to dynamically scan all requests and determine the likely category for each request. Either of the two options can be implemented via the adaptor.

Figure 3:
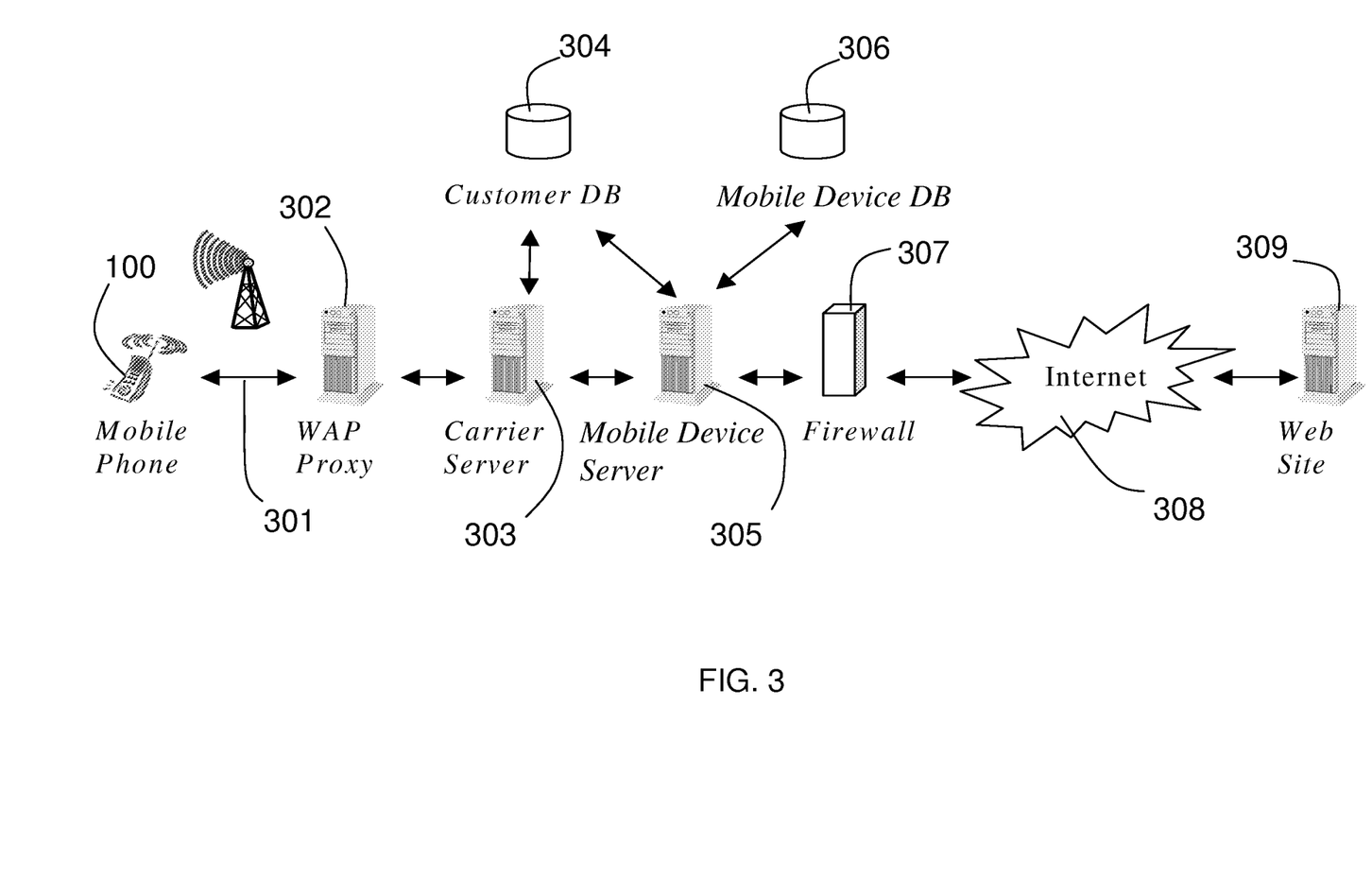
FIG. 3 depicts a system overview according to an embodiment.

FIG. 3 illustrates a system upon which an embodiment of the current invention may be implemented. Mobile Phone 100 is a device capable of transmitting, receiving, and accessing voice and data information. Mobile Phone 100 also contains a mobile browser (not shown) used to access content on the Internet.

Such Internet content can be in the form of web pages, downloadable applications, or downloadable ring tones, wall papers, screen savers, and other content accessible on the Internet. The web pages can be documents written in HyperText Markup Language ("HTML"), Extensible HyperText Markup Language ("XHTML"), Java, Active Server Pages ("ASP"), Hypertext Preprocessor ("PHP"), Wireless Markup Language ("WML"), or other suitable programming platforms. The applications can be executable binaries compatible with the Mobile Phone 100 written in JAVA, BREW, Symbian, or other suitable programming platforms. The downloadable ring tones, wall papers, screen savers, etc. can be files of any audio or video format that can be displayed by the Mobile Phone 100.

The Mobile Phone 100 may access content on the Internet through a Transmissions System 301. The Transmission System 301 is a communications system capable of transmitting and receiving voice and data information passing between the Mobile Phone 100 and a Wireless Application Protocol Proxy ("WAP Proxy") 302. The Transmission System 301 may include cellular phone networks, transmission towers, and other suitable mobile communication networks. The cellular phone networks or MVNOs may be compatible with GSM or CDMA supporting CDMA 2000, 3G, GPRS, and EDGE networks.

WAP Proxy 302 is used for encoding and decoding requests for content from the Mobile Phone 100 and content sent to the Mobile Phone 100. The content sent to the Mobile Phone 100 includes content generated in response to a request for content from the Mobile Phone 100. Examples of such content are web pages, downloadable applications, or downloadable ring tones, wall papers, screen savers, etc. WAP Proxy 302 is also used for optimizing communication to and from the Mobile Phone 100.

The WAP Proxy 302 passes the request for content from the Mobile Phone 100 to a Carrier Server 303, which is used by carriers to check user accounts, log user activity, and allow or disallow access to the Internet. The Carrier server 303 relies on a Customer Database 304 for information related to these activities. The Customer Database 304 contains customer account information such as names, telephone numbers, addresses, and profiles among others. This information can be in any known database format. In some implementations, proprietary carrier architectures tied into proprietary billing systems can be implemented to process and store billing and customer records.

The Carrier Server 303 also passes the request for content to a Mobile Device Server 305. The Mobile Device Server 305 is used to control user access to domain names, sub-domain names, websites, and/or individual files. This control is achieved based on information stored in the Customer Database 304 and a Mobile Device Database 306. The Customer Database 304 may include carrier's user database for storing and managing customer profiles and options. Such information is passed to the Mobile Device Server 305 in response to a request for such information by the Carrier Server 303 or the Mobile Device Server 305.

The Mobile Device Database 306 contains various content identifiers such as approved and disapproved content. For instance, the Mobile Device Database 306 may further categorize or authorize sub-portions or groupings of data in Filter Adaptor 514 (Further described with reference to FIG. 5). For example, the Mobile Device Database 306 can include a categorization of domain names, sub-domain names, websites, keywords, and/or individual files. The Mobile Device Database 306 can also include a list of categorized Internet websites based on content and/or meta data describing and/or associated with the website or individual webpage. This information can be in any known database format. The categorizations can be based on content topic such as adult, sports, news, or other content topics or types. The Mobile Device Database 306 can further include lists of viruses, SPAM, while/black lists, and a categorized list of carrier-hosted applications. In some implementations, the Mobile Device Database 306 can be an off-the-shelf database.

The Mobile Device Server 305 also contains software that monitors and stores the activity of the user (not shown) of the Mobile Phone 100. This information can be logged and stored on the Mobile Device Server 305, the Customer Database 304, or elsewhere.

If the Mobile Device Server 305 does not authorize a request by the Mobile Phone 100, it returns an error message to the Mobile Phone 100. If the Mobile Device Server 305 does authorize a request by the Mobile Phone 100, the authorized request is passed to a Firewall 307. The Firewall 307 controls access to the Internet 308 from within the carrier network and also restricts unauthorized incoming traffic from the Internet 308 to the carrier network.

The severs on the Internet 308 relay the request from the Firewall 307 to a Website 309. The connection between the Firewall 307 and Website 309 can be direct or indirect.

The Website 309 contains the content requested by the Mobile Phone 100. The Website 309 can be information stored on a server (not shown) that is connected to the Internet 308 and the server may accept external requests for information such as the Website 309. In response to the external request for information (e.g., from the Mobile Phone 100) the Website 309 transfers the information requested by the Mobile Phone 100 to the Firewall 307. The information is relayed to the Firewall 307 through the Internet 308.

The Firewall 307 passes the requested information to the Mobile Device Server 305. The Mobile Device Server 305 passes the requested information to the Carrier Server 303. The Carrier Server 303 passes the requested information to the WAP Proxy 302. The WAP Proxy 302 passes the information to the Transmissions System 301. The Transmissions System 301 then transmits the information to the Mobile Phone 100.

Thus far, the components and characteristics of the system have been described. Referring again to FIG. 3, one implementation of an operating environment or "software stack" is described below. As described above, the Mobile Phone 100 is a device capable of transmitting, receiving, and accessing voice and data information. The Mobile Phone 100 must be activated and have data and voice access capabilities. The Mobile Phone 100 may be implemented to establishes a data call through the Transmissions System 301 and connect to the WAP Proxy 302.

The request and transmission process starts when the Mobile Phone 100 generates a request over the air to access a particular URL or to download a particular file. This request may normally be made using a mobile browser on the Mobile Phone 100. In some implementations, the request may also be generated as an HTTP, User Datagram Protocol ("UDP"), socket, or any other suitable protocol request that use a URL.

The WAP proxy 302 receives the request through the Transmission System 301 and translates the request. The translated request is passed onto the Carrier Server 303. The Carrier Server 303 sends a request to the Customer Database 304 to send information contained in the user profile associated with the Mobile Phone 100 or with the current user of the Mobile Phone 100. The Carrier Server 303 then validates access to the requested data service for the mobile phone account associated with Mobile Phone 100 or with the current user of Mobile Phone 100. If access to the requested data service is not allowed, a service denied response is sent through the WAP Proxy 302 to Mobile Phone 100, and the process starts over again. If access to the requested data service is allowed, the URL is passed to the Mobile Device Server 305.

The Mobile Device Server 305 searches for the requested URL (or a portion of the URL or request) in the Mobile Device Database 306. If found, the requested URL may be retrieved along with its category or any other meta data associated with the requested URL. Next, the Mobile Device Server 305 tries to match the category or other meta data of the requested URL against the categories or other meta data permitted to Mobile Phone 100 or the current user of Mobile Phone 100 based on the profile information contained in the customer database 304.

The Mobile Device Server 305 also logs the activity associated with browsing and/or website interaction and meta data associated with the applications and/or content that is accessed in the Mobile Device Database 306.

If the category of the URL sent to the Mobile Device Server 305 is an allowed category for the Mobile Phone 100 or the current user of the Mobile Phone 100 as defined by the Customer Database 304, the URL request is sent to the Firewall

307. The Firewall 307 then routes the URL request over the Internet 308 to the Website 309, the ultimate destination of the URL request initiated by the Mobile Phone 100.

Back and forth communication can then proceed between the Website 309 and the Mobile Phone 100. If the Website 309 attempts to redirect the user to another site or the user goes to another site by means of clicking on a hyperlink, selecting a bookmark, entering a new URL or other, the process can start over and the new URL is evaluated.

Hardware Overview

The systems and methods described herein can be performed by one or more programmable processors executing programmed instructions to perform functions by operating on input data and generating an output. The methods can also be performed by, and the systems can be implemented as, special purpose logic circuitry. Examples of such special purpose logic circuitry include a Field Programmable Gate Array ("FPGA"), a Complex Programmable Logic Device ("CPLD", an Application Specific Integrated Circuit ("ASIC"), or flash memory.

Processors suitable for the execution of programmed instructions include, by way of example, both general and special purpose microprocessors. Generally, a processor will receive instructions and data from a read only memory ("ROM") or a random access memory ("RAM") or both. Information carriers suitable for embodying programmed instructions and data include, by way of example, semiconductor memory devices such as EPROM, EEPROM, and flash memory devices. The processor and the memory can be supplemented by, or incorporated in special purpose logic circuitry.

The connections between the processors and other hardware used to execute programmed instructions include both wired and wireless connections. Examples of wired connections include Ethernet networks, Token Ring networks, phone lines, and other network connections. Examples of wireless connections include wireless networks according to the protocols established by the IEEE802.11a, 802.11b, and 802.11g standards.

Infrastructure within a Carrier

Figure 4:
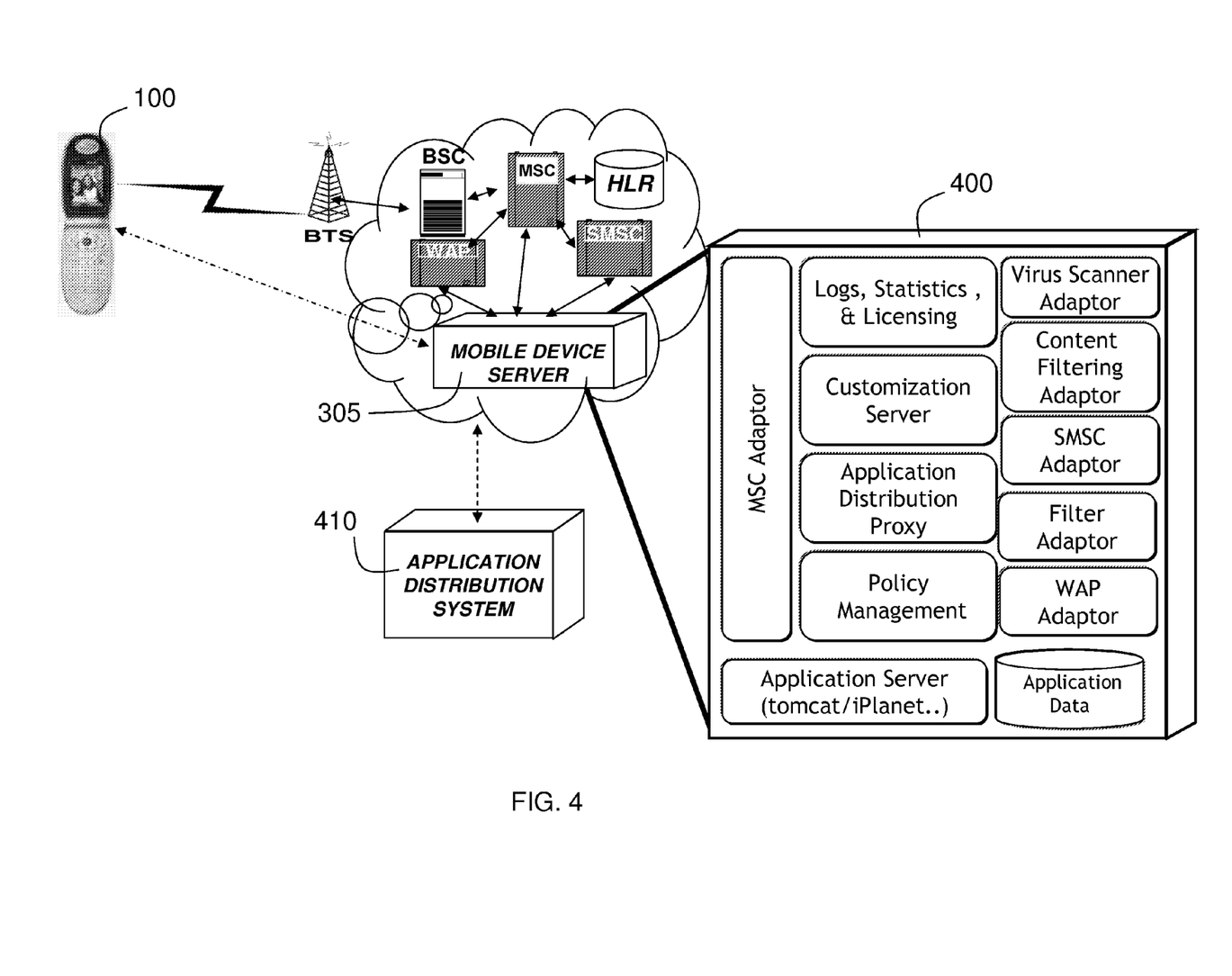
FIG. 4 depicts a system architecture according to an embodiment with the system infrastructure hosted within a carrier.

FIG. 4 depicts a system architecture according to an embodiment with the system infrastructure hosted within a carrier. Both the hardware, described with reference to FIG. 3 and software stack 400 for Mobile Device server 305 are depicted. Notably, FIG. 4 includes an application distribution system 410, which is a server that functions to distribute and, in some instances, balance the work through the distributed intranet or virtually private network associated with a large corporation. The application distribution system 410 allows a corporation to remotely access and update their users' information and make this data available for incorporation into the carrier's user/customer database, interacting with the carrier server 303.

The Mobile Device server 305 can provide the means to control and/or monitor mobile applications and data transfer through following features: (1) allowing/disallowing access to carrier-sponsored applications (e.g., Java, BREW, and Symbian); (2) content filtering of WAP data to prevent inappropriate access and/or desktop end-around; (3) virus/spyware/peer-to-peer ("P2.pi.") network management and detection to prevent network and phone damage; (4) short message service ("SMS")/spam/instant messaging ("IM")/spam over instant messaging ("SPIM") detection and filtering to prevent nuisance and maintain customer satisfaction; (5) digital rights management ("DRM")/P2P network management to minimize significant carrier exposure to IP protection issues; and (6) account management to set monetary limits on data use and purchases for customer convenience and ease of payment collection for the carrier. The software stack 400 can be implemented to carry out at least some of the features described above and will be discussed further in connection with the system infrastructure within an enterprise.

Infrastructure External to a Carrier

Figure 5:
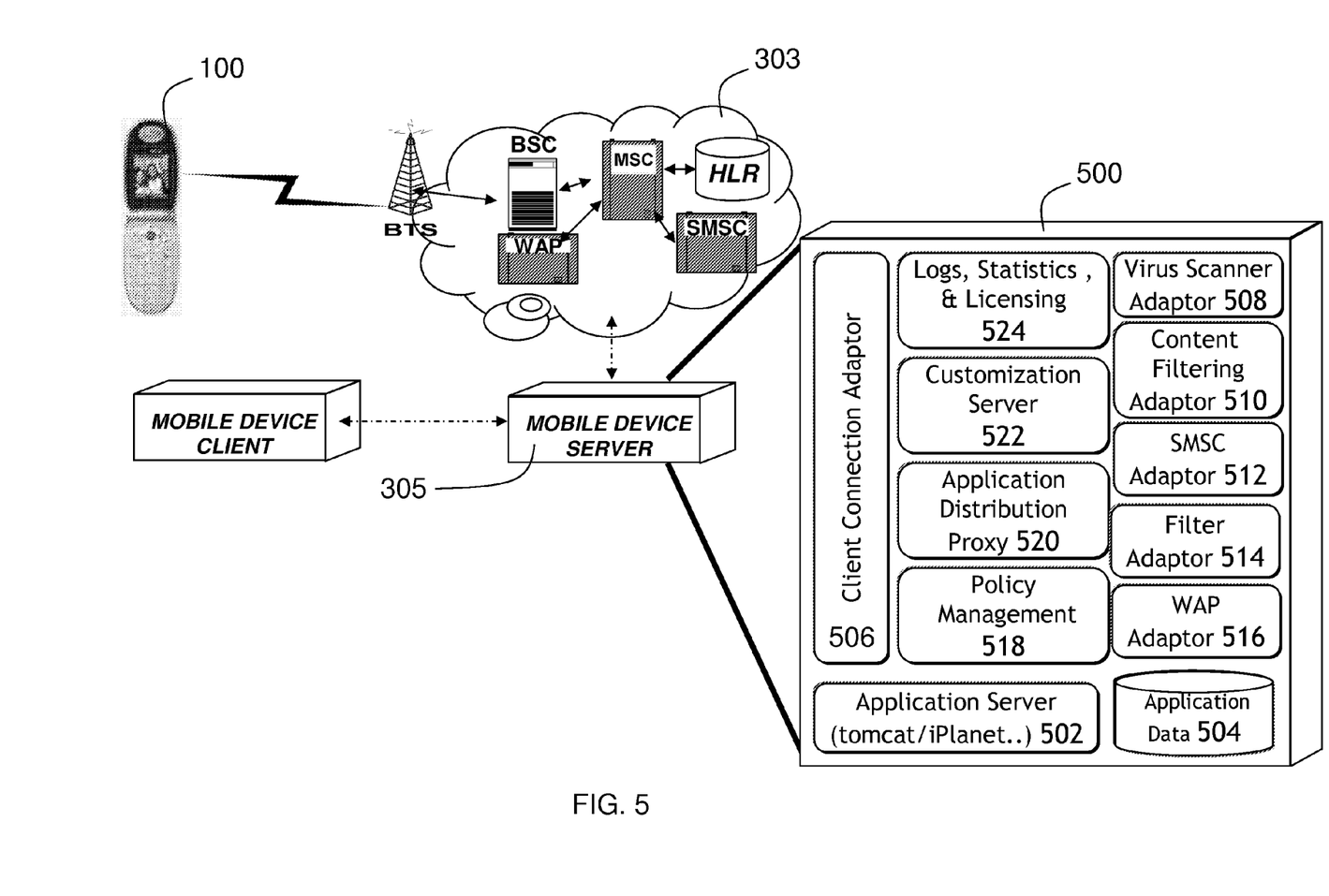
FIG. 5 depicts a system architecture according to an embodiment with the system infrastructure hosted external to a carrier.

FIG. 5 depicts a system architecture according to an embodiment with the system infrastructure external to a carrier. FIG. 5 may also include the application distribution system 410. More particularly, a software stack 500 for the Mobile Device server comprises sets of software modules and combinations of off-the-shelf hardware specially configured and communicatively coupled to implement the methods and systems described above.

At the lowest layer of the software stack 500 is an application server 502 configured to manage the communication and brokering of the various components in the software stack 500 and the rest of the system architecture. The application server 502 may be implemented as an open-source Apache Tomcat server. In some implementations, the application server 502 may be a Sun One Web server (formerly iPlanet Web server), which runs under NT/2000, Solaris and HP-UX supporting JavaServer Pages ("JSP") technology, Java servlets, and Server-Side JavaScript ("SSJS"). In yet other implementations, the application server 302 may be other suitable Web Servers.

The software stack 500 can also include an application data layer 504. The application data layer 504 may include at least one electronic storage medium such as a database, flat file system, or cache for storing data associated with the application and/or the various modules in the software stack 500.

The software stack 500 can include a policy management layer 518 configured to manage Internet activity for users. For example, an employer can set policies for regulating Internet activity of it's employees on the mobile phone 100 provided by the employer. Using the policy management layer 518, the employer can determine which Internet Websites and contents can be accessible by the employees.

The software stack 500 can include an application distribution proxy 520 to mediate communication between the mobile phone 100 and the carrier server 503 to enforce access control and security. Instead of blindly forwarding packets, the application distribution proxy 520 can be implemented to allow only valid protocol exchanges to take place. The application distribution proxy can also enforce complex access control policies and rules.

The software stack 500 can also include a customization server 522 configured to customize Internet access for each employer and/or each employee. For example, each employer may customize Internet access for its employees based on various employer set factors such as job duties.

Customizing Internet access can include selecting approved Internet sites, setting download limits, and allocating time limits on Internet access and activity. The customization server 522 may communicate with the customer database 504 and/or the Mobile Device database 506 to determine if the requested content is a valid content accessible by the mobile phone 100 associated with a user profile.

In addition, various adaptor layers may be included in the software stack 500 to facilitate monitoring, controlling, and filtering Internet activity on the mobile phone 100. These adaptors may includes a client connection adaptor 506, a virus scanner adaptor 508, a content filtering adaptor 510, a SMSC adaptor 512, a filter adaptor 514, and a WAP adaptor 516. For example, the client connection adaptor 506 can facilitate log-in validation of the user when requesting access to certain Internet websites from the mobile phone 100. The virus scanner adaptor 508 can handle downloads obtained from sources outside of approved locations that may contain viruses. The content filtering adaptor 510 can filter carrier-hosted applications and content directed to the mobile device by referencing a licensed database or external filter. The SMSC adaptor 512 can place limits on the number of non-verbal communications (e.g. SMS, instant messages, or other text messaging) over a time specific period. The filter adaptor 514 can be an off the shelf filtering component or stand-alone database. The filter adapter 514 can identify and block access to Internet sites containing sexually explicit, offensive, or other material deemed inappropriate in the workplace. It can also identify and toggle Internet sites that are necessary for some employees, but not necessary for others to do their work. The WAP adaptor 516 can be used to filter applications and/or programs provided for execution, both binary or scripted type program content.

With each or all of the adaptors, one or more relational databases can be employed, such as all or parts of customer database 304 and Mobile Device database 306, with a table or combination of fields for each adaptor, maybe used for filtering the content and managing Internet usage.

The software packet 500 may also include a logs, statistics & licensing layer 524 configure to facilitate monitoring of the Internet activity. Each time a user successfully connects to the Internet and sends requests for content, a log may be crated to keep track of all Internet activity of each user. For example, an employer may maintain a history of Internet activity of all employees, which can be used to analyze work productivity levels and calculate costs associated with mobile device usage.

Multiple embodiments of the disclosure have been described. Nevertheless, it will be understood that various modifications may be made to these embodiments without departing from the spirit and scope of the disclosure and as defined in the accompanying claims.

I claim:

1. A system for managing internet activity of a mobile device, the system comprising:
    a proxy communicatively coupled to transmit and receive data information to and from the mobile device, and operable to mediate communication between the mobile device and a network, the proxy server to receive a request for content to be displayed on the mobile device via a wireless communication network, and wherein the request is addressed to a server having access to the content, and wherein the request is sent by an application on the mobile device via the wireless communications network and the proxy receives a user profile of a user using the application;
    a carrier server operable to log user activity, and allow or disallow the mobile device access to the communication network; and
    a mobile device server operable to control user access to content based on message content within communication to and from the mobile device, the mobile device server to determine whether content associated with the request is allowable based on at least in part the user profile and a preconfigured policy concerning content, and responsive to the determination, and allow the content associated with the request to be downloaded to the application of the mobile device via the wireless communication network if allowed, the mobile device server to not send the content to the mobile device via the wireless communication network if not allowed.

2. The system of claim 1, wherein the carrier server is further operable to:
    communicate with a customer data storage to search for data including user profiles and user activity to determine if the mobile device is authorized to access the internet; and
    pass a request for content from the mobile device to the mobile device server.

3. The system of claim 2, wherein the customer data storage is operable to store formatted information comprising user names, profiles, and content identifiers.

4. The system of claim 2, wherein the mobile device server is operable to control user access to domain names, sub-domain names, websites, and individual files based on information stored in the customer data storage and a mobile device data storage.

5. The system of claim 4, wherein the mobile device data storage is operable to store formatted information comprising a categorization of domain names and keywords.

6. The system of claim 5, wherein the mobile device data storage is further operable to store formatted information comprising a complete list of all internet websites with associated categories based on content or metadata describing the websites.

7. The system of claim 1, wherein the software stack further comprises a filter adaptor operable to monitor and store internet activity associated with the user profile.

8. The system of claim 1, wherein the mobile device server is further operable to send an error message to the mobile device in response to an unauthorized request for content from the mobile device, and to pass the request for content to a firewall in response to an authorized request for content.

9. A computer-implemented method for managing internet activity of a mobile device, the method comprising:
    transmitting and receiving data information to and from the mobile device, including receiving a request for content to be displayed on the mobile device via a wireless communication network, and wherein the request is addressed to a server having access to the content, and wherein the request is sent by an application on the mobile device via the wireless communications network;
    receiving a user profile of a user using the application;
    controlling user access to content, including determining whether content associated with the request is allowable based on at least in part the user profile and a preconfigured policy concerning content;
    responsive to the determination,
    allowing the content associated with the request to be downloaded to the application of the mobile device via the wireless communication network if allowed; and
    not sending the content to the mobile device via the wireless communication network if not allowed.

10. The method of claim 9, further comprising:
    searching for customer data including user accounts and user activity to determine if the mobile device is authorized to access the internet.

11. The method of claim 10, where in the customer data is formatted information comprising user names, profiles, and content identifiers.

12. The method of claim 10, further comprising:
    controlling user access to domain names, sub-domain names, websites, and individual files based on the customer data.

13. The method of claim 12, wherein the customer data is formatted information comprising a categorization of domain names and keywords.

14. The method of claim 13, wherein customer data is formatted information comprising a complete list of all internet websites with associated categories based on content or metadata describing the websites.

15. The method of claim 10, further comprising:
monitoring and storing internet activity associated with the user profile.

16. The method of claim 9, further comprising:
sending an error message to the mobile device in response to an unauthorized request for content from the mobile device; and
passing the request for content to a firewall in response to an authorized request for content.

17. The method of claim 9, wherein the content comprises at least one of a text message and an instant message.

18. The method of claim 9, wherein the application requesting content comprises at least one of a browser application, a text messenger application, and an instant messenger application.

19. The method of claim 9, wherein the mobile device displays an indication that access to the content is blocked if the content is not allowed.

20. A non-transitory computer readable medium storing computer code that, when executed by a processor, performs a method for managing internet activity of a mobile device, the method comprising:

transmitting and receiving data information to and from the mobile device, including receiving a request for content to be displayed on the mobile device via a wireless communication network, and wherein the request is addressed to a server having access to the content, and wherein the request is sent by an application on the mobile device via the wireless communications network;

receiving a user profile of a user using the application;

controlling user access to content, including determining whether content associated with the request is allowable based on at least in part the user profile and a preconfigured policy concerning content;

responsive to the determination, allowing the content associated with the request to be downloaded to the application of the mobile device via the wireless communication network if allowed; and not sending the content to the mobile device via the wireless communication network if not allowed.

* * * * *